July 5, 1927.

H. W. MELLING

LATHE

Filed Dec. 10, 1926

INVENTOR
Herman W. Melling
BY
Chappell & Earl
ATTORNEYS

July 5, 1927.

H. W. MELLING

LATHE

Filed Dec. 10, 1926

INVENTOR
Herman W. Melling
BY
Chappell & Earl
ATTORNEYS

Patented July 5, 1927.

1,634,550

UNITED STATES PATENT OFFICE.

HERMAN W. MELLING, OF JACKSON, MICHIGAN.

LATHE.

Application filed December 10, 1926. Serial No. 153,855.

My improvements relate to lathes of the class illustrated in my application for Letters Patent Serial No. 416,750, filed October 13, 1920.

The main objects of this invention are:

First to provide an improved lathe for the turning of non-circular forms such as cams.

Second, to provide an improved pattern reproducing lathe by means of which non-circular forms such as cam shafts may be rapidly and accurately reproduced.

Third, to provide an improved lathe having these advantages which is of large capacity and largely automatic in its operation.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which.

Figures 1, 3:
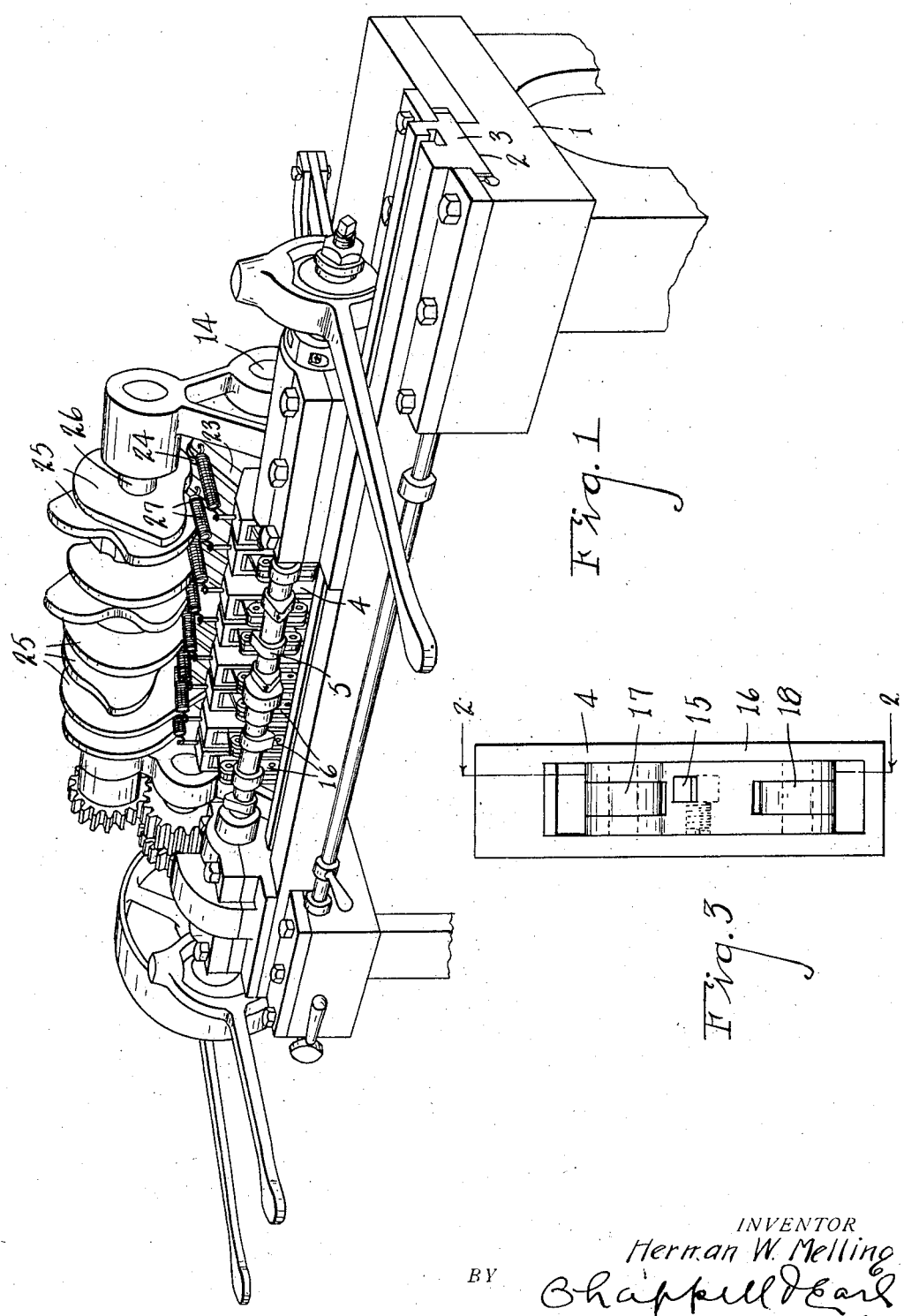
Fig. 1 is a detail front perspective view of a structure embodying the features of my invention.
Fig. 3 is a front elevation of one of the tool carriages.
Figure 2:
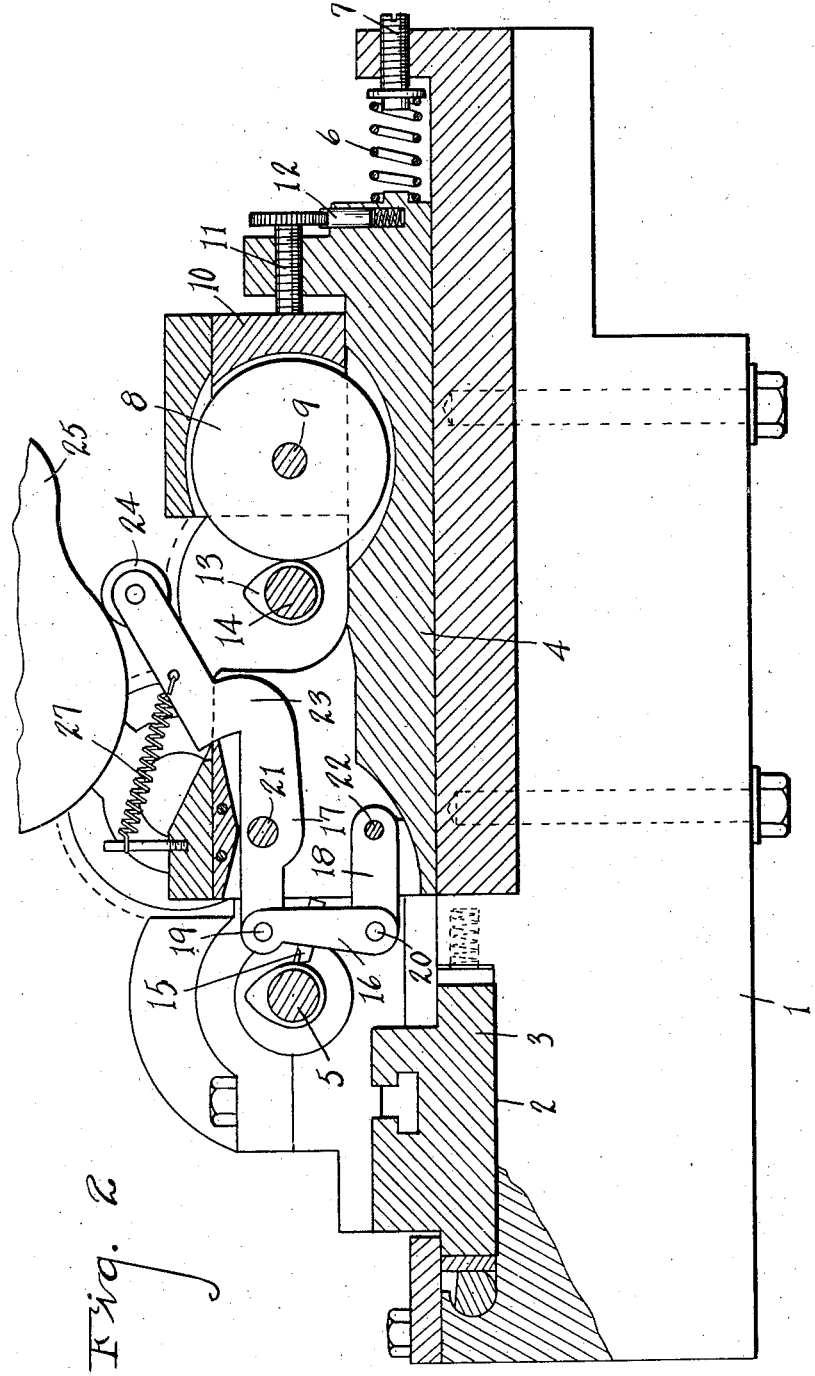
Fig. 2 is a detail view partially in transverse section on a line corresponding to line 2—2 of Fig. 3.

Referring to the drawing, the bed 1 of the machine is provided with a way 2 for the work carriage 3. The work carriage is mounted on this way for longitudinal and lateral movement and carries the chuck for the work, means being provided for rotating the work and for feeding the carriage. As such means form no part of my present invention and as they are described and claimed in Letters Patent No. 1,512,995, issued to me October 28, 1924, I do not illustrate or describe the same in detail herein.

The bed of the machine is also provided with ways for a plurality of tool carriages 4, a carriage being provided for each cam to be cut. These tool carriages 4 are mounted for reciprocating movement transversely to the axis of the work 5. As the carriages are duplicates a description of one will suffice.

The carriage 4 is urged toward the work by means of the spring 6, an adjusting screw 7 being provided for adjusting the tension of the spring. The carriage is provided with an abutment roller 8, the journal 9 of which is mounted on an adjustable block 10, this block being adjusted by means of the screw 11. A spring pressed detent 12 is provided for holding the screw 11 in its adjusted position.

The abutment roller coacts with the master cam 13 which is a replica in shape of the work to be cut, for instance the structure illustrated is designed for the turning of the several cams of a cam shaft for an automobile engine. The cam 13 is one of the several cams of a cam shaft 14 which may be a cam shaft taken from stock or which is a replica of the cam shaft to be reproduced.

It will be observed that the master cam 13 controlling the reciprocation of the carriage is disposed in an opposed relation to the spring 6, that is, while the spring 6 urges the carriage to the work, the master cam reciprocates the carriage against this spring, thereby preventing the tool from taking more than a cut of the desired depth; that is, the tool cannot "hog" into the work.

The tool 15 is mounted on a holder 16 for oscillating movement in a plane transverse to the axis of the work and is non-tiltable as distinguished from the pivotally mounted tool holder of my said application for Letters Patent.

The tool holder 16 is supported by parallel links 17 and 18, the tool holder being pivoted to the outer ends of the links 17 and 18 at 19 and 20, respectively. The link 17 is pivoted on the carriage at 21 while the link 18 is pivoted on the carriage at 22.

The link 17 is provided with a rearwardly and upwardly projecting arm 23 carrying a roller 24 coacting with the cam 25, there being one of the cams 25 for each unit or tool carriage. The several cams 25 are mounted on a cam shaft 26. The spring 27 holds the roller 24 against the cam.

The cam 25 is rotated in synchronism with the rotation of the master cam 13 and the work so that the tool is oscillated or reciprocated in a plane transverse to the axis of the work as the tool carriage is reciprocated. The cam 25 is so conformed that the point of the tool is caused to engage the work at a point corresponding to the point of contact of the master cam with the abutment roller. The links are arranged so that the radius in which the point of the tool travels corresponds to the radius of the abutment roller. The result is that work which is a replica of the pattern or master cam is produced.

Figure 4:
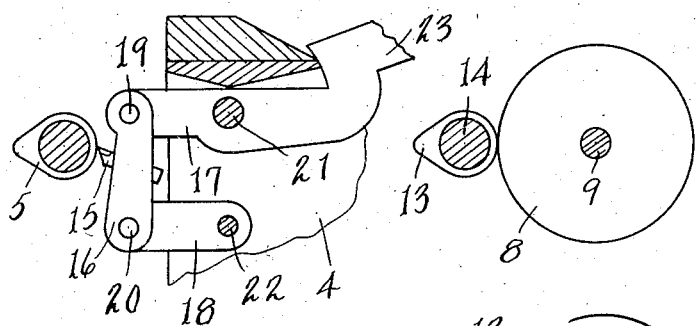
Figs. 4, 5, 6, 7 and 8 are detail views illustrating the relative relation of the master cam to its coacting abutment on the tool carriage and the tool to the work in several of the positions of these parts during operation thereof.
Figure 5:
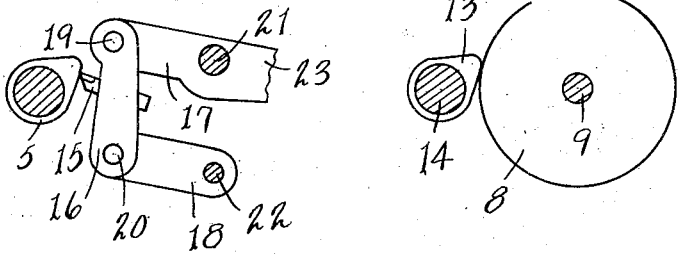
Figure 6:
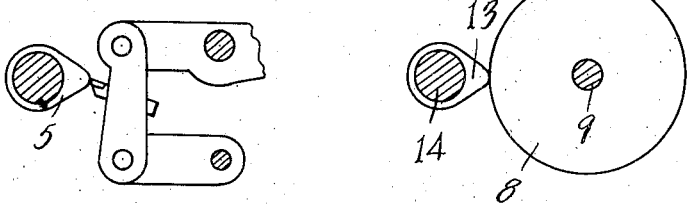
Figure 7:
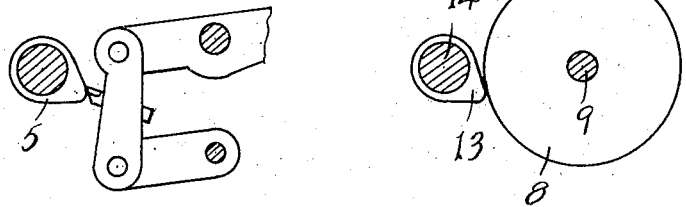
Figure 8:
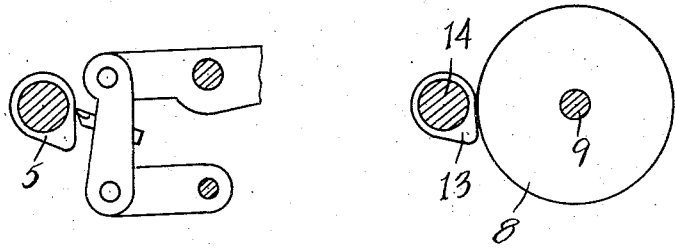

In Figs. 4 to 8, inclusive, I illustrate the master cam in various positions relative to the abutment roller and also the tool in corresponding positions occupied by it. It will be observed that the point of contact of the abutment roller moves in a vertical plane as the master cam revolves, this being a plane through the axis of the abutment roller, the master cam and the work. The point of the tool is maintained in the same plane as the point of contact of the abutment roller and the work and is caused to travel or describe a path corresponding to that at the point of contact of the master cam and abutment roller, this resulting as stated in the reproduction of the pattern.

Structures embodying my improvements are of large capacity, and strong and durable, requiring a minimum of attention in operation.

Having thus described my invention what I claim as new and desire to secure by Letters Patent is:

1. In a structure of the class described, the combination of a work carriage, means for rotatably supporting the work on said carriage, a tool carriage reciprocating laterally of said work carriage, a master cam which is a replica in shape of the work to be cut, an abutment roller on said tool carriage coacting with said cam, a tool, a tool holder, a pair of links on which said tool holder is pivotally mounted on said carriage in parallel relation, one of said links being provided with an arm, a cam coacting with said arm whereby said tool holder is oscillated in a plane transverse to the axis of the work and the cutting edge of the tool in relation to the work corresponds with the point of contact of the master cam with the abutment roller, and means for driving the work and the master cam at the same speed.

2. In a structure of the class described, the combination of a work carriage, means for rotatably supporting the work on said carriage, a tool carriage reciprocating laterally of said work carriage, a master cam which is a replica in shape of the work to be cut, an abutment coacting with said cam, a tool, a tool holder, a pair of parallel supporting links on which said tool holder is pivotally mounted, means for oscillating said links whereby said tool holder is oscillated in a plane transverse to the axis of the work and the cutting edge of the tool in relation to the work corresponds with the point of contact of the master cam with the abutment, and means for driving the work and the master cam at the same speed.

3. In a structure of the class described, the combination of means for rotatably supporting the work a tool carriage provided with a cam abutment roller, a pattern cam which is a replica in shape of the work to be cut coacting with said abutment roller to reciprocate said carriage, a tool, a tool holder, a support therefor comprising a pair of parallel links pivotally mounted on said carriage, one of said links being provided with an arm, a cam coacting with said arm whereby said tool holder is oscillated transversely to the axis of the work and so that the cutting point of the tool engages the work at a point corresponding to the point of contact of the master cam with said abutment, and means for driving the work and the pattern cam in synchronism.

4. In a structure of the class described, the combination of a rotary work holder, a reciprocating tool carriage, a master cam corresponding in shape to the work to be cut, an abutment on said carriage coacting with said master cam, a tool, a tool holder non-tiltably mounted on said carriage for reciprocating movement in a plane transverse to the axis of the work, and means for reciprocating said tool holder so that the path of travel described by the cutting edge of the tool corresponds with that at the point of contact of the master cam and abutment.

5. In a structure of the class described, the combination of a rotary work holder, a reciprocating tool carriage, a master cam corresponding in shape to the work to be cut, an abutment on said carriage with which said master cam coacts, a tool, a non-tiltable tool holder mounted on said carriage for oscillating movement in a plane transverse to the plane of movement of the tool carriage, means for reciprocating said tool holder timed with the rotation of said master cam and so that the path described by the point of the tool corresponds with that of the point of contact of the master cam with the abutment, and means for rotating the work and the master cam in synchronism.

In witness whereof I have hereunto set my hand.

HERMAN W. MELLING.